July 14, 1942.  E. S. RINALDY  2,290,071

MOTION PICTURE SELECTOR APPARATUS

Filed Oct. 18, 1940  5 Sheets-Sheet 1

INVENTOR.
EDWARD S. RINALDY
BY
ATTORNEY.

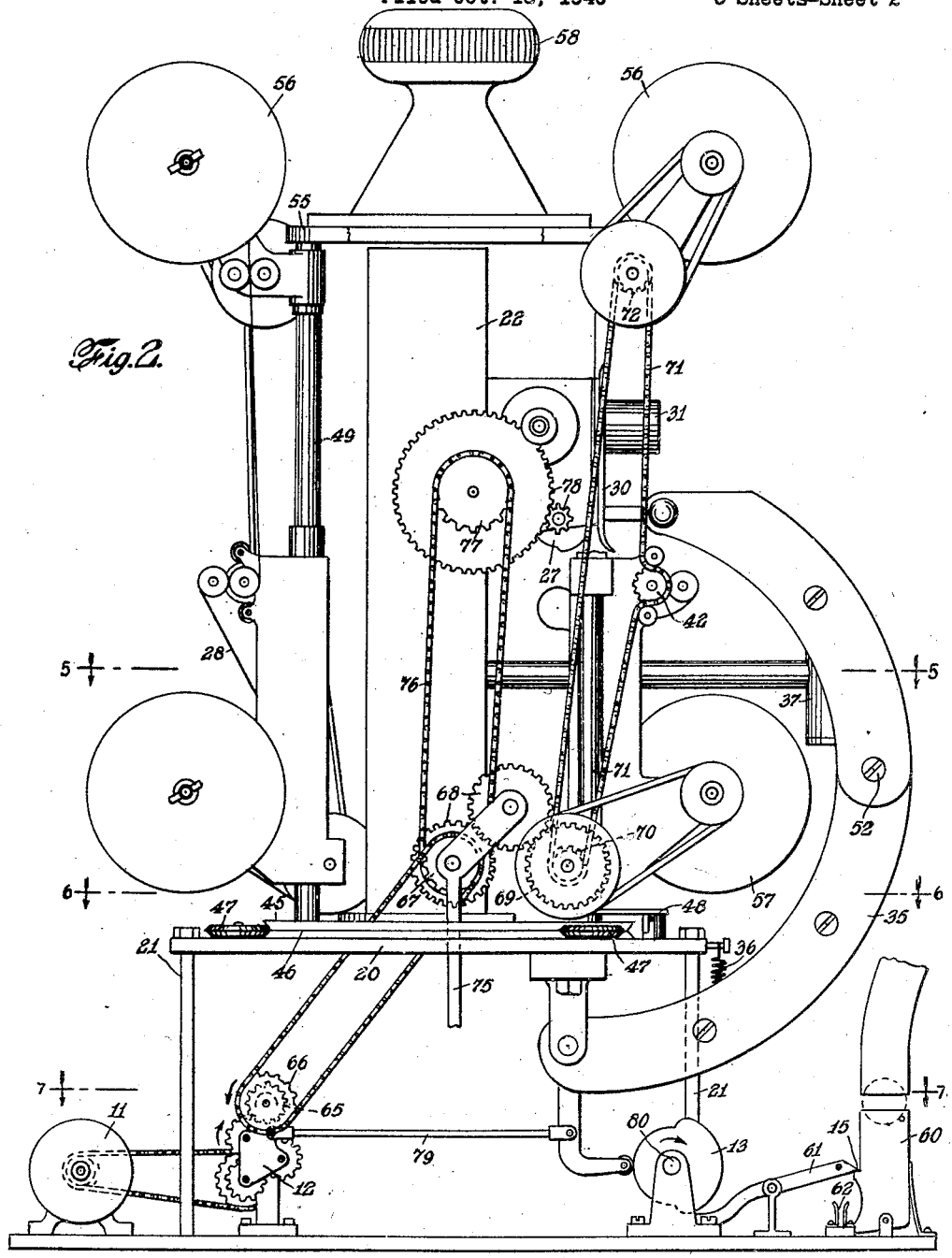

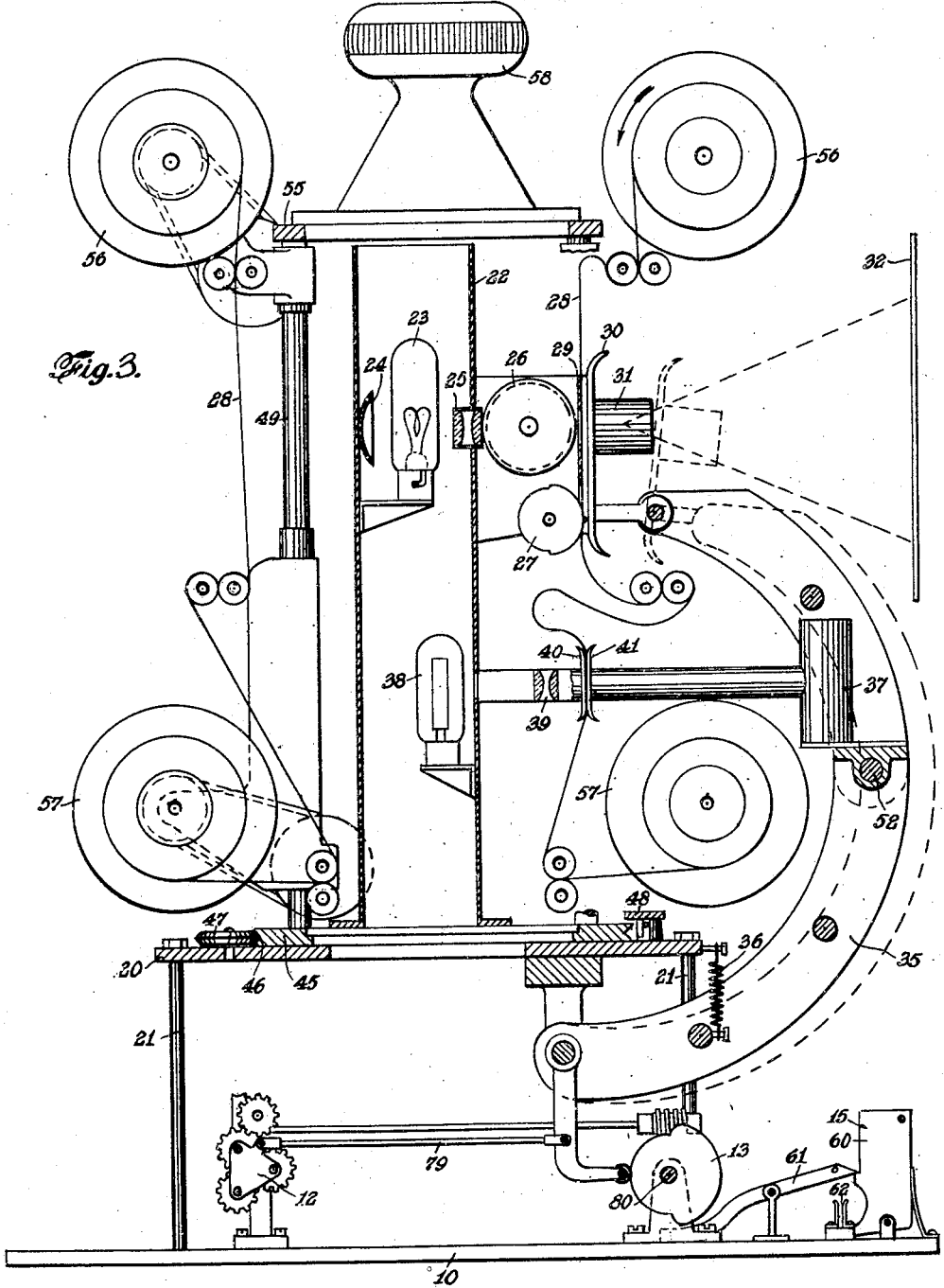

July 14, 1942.    E. S. RINALDY    2,290,071
MOTION PICTURE SELECTOR APPARATUS
Filed Oct. 18, 1940    5 Sheets-Sheet 4
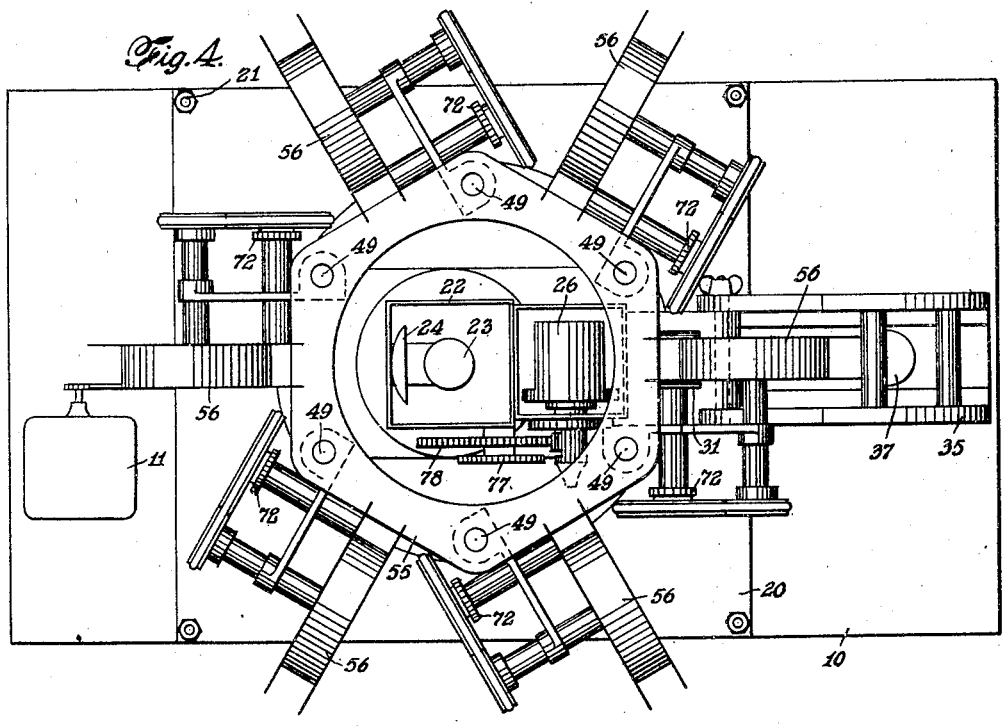
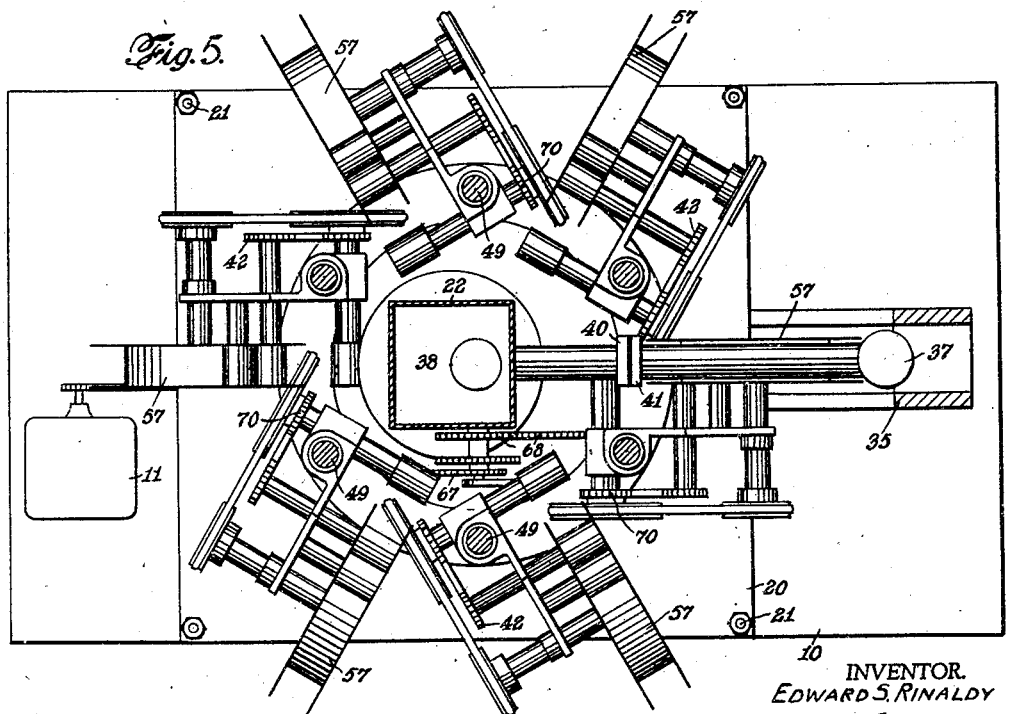
INVENTOR.
EDWARD S. RINALDY
BY
ATTORNEY.

July 14, 1942.  E. S. RINALDY  2,290,071
MOTION PICTURE SELECTOR APPARATUS
Filed Oct. 18, 1940  5 Sheets-Sheet 5

INVENTOR.
EDWARD S. RINALDY
BY
ATTORNEY.

Patented July 14, 1942

2,290,071

UNITED STATES PATENT OFFICE 2,290,071

MOTION PICTURE SELECTOR APPARATUS

Edward S. Rinaldy, Chester, N. J.

Application October 18, 1940, Serial No. 361,651

7 Claims. (Cl. 88—17)

The invention relates to a multiple motion picture projector apparatus which may, if desired, be arranged also to provide a related audible program.

The invention has for an object a projector apparatus embodying a single lamp and projection system, together with a plurality of sets of film reels movably associated therewith and adapted for selective projection of the subject matter of the films carried respectively by the sets of reels.

The invention has for an object, also, a construction which avoids the use of an endless film strip now generally utilized in multiple projection apparatus, thus simplifying the apparatus and reducing its size as well as the initial cost of the same.

A further object of the invention is so to associate the sets of film reels with the single projector mechanism that any one film or all of the films so associated may readily be replaced when it is desired to alter the program; and that the apparatus may readily and conveniently be serviced.

Still another object of the invention is to afford an apparatus suitable for home use as in the projection of amateur films, as well as for commercial purposes.

In carrying out the invention, but a single projection means is utilized, the film sets being designed to be moved about a fixed portion of the same with provision made for selection of any desired set. To this end, this portion of the projection apparatus comprises a lamp house with lamp and reflector and condensing lens as well as shutter mechanism and means for advancing intermittently a film before the shutter, together with the rear or inner half of the usual type of apertured gate through which a film is to be drawn by the film-advancing mechanism in front of the shutter and behind an objective or projecting lens. The latter, however, together with the front or outer half of the gate, is separable from the aforesaid portion of the projector apparatus which is in fixed relation to a suitable support or base, both the gate half and the lens being supported by an element movably mounted with respect to the base.

Provision is made to move said supporting element automatically in a manner such that the said lens and outer gate half will be presented in juxtaposition to the remaining fixed portion of the projection means at the proper time and will likewise be automatically withdrawn therefrom to permit repetition of the cycle either with the same film or with a different film. When it is desired also to associate a related sound program with the exhibition of the film, this movable supporting element will carry one of the elements of the photo-electric system, for example, the exciter lamp and a half of a further gate, in which case the photo-electric cell and other half of the gate is fixed as in being carried by the lamp housing or base upon which the housing is supported.

To provide for the convenient selection of a desired film of the plurality of films, the sets of reels for the respective films are mounted upon a carrier movable about the fixed projector portion, for example, rotatable about a vertical axis and supported directly or indirectly by the base. The mounting may be such that a carrier with its sets of film reels may be bodily removed from the base with respect to the remainder of the apparatus for convenience in exchanging the reels on said carrier or for the substitution of a carrier with new sets of films. This substitution of carriers is of value in admitting of the loading at a central point and thereby expediting servicing in the field.

Provision is made for feeding the film from the feed reel of a set to the take-up reel of such set, as well as for reversing the operation on completion of the showing, all of which is effected automatically after the movable element carrying the projecting lens and outer half of the gate have been juxtaposed to the inner portion of the gate and advancing mechanism for drawing down film from a feed reel. In addition, provision is made whereby operation of the primary driving means for the different actions is discontinued at the completion of a cycle, namely: inward movement of the movable element, feeding of a film, retraction of the movable element, and rewinding of the film. The apparatus is then in condition for repetition of a cycle either with the same or with a different film. Such film may be conveniently selected either manually or automatically, as by means of well known coin-controlled mechanism, by moving the carrier to bring the selected film in position before the shutter and lens system, means being provided to insure proper positioning.

The nature of the invention, however, will best be understood when described in connection with the accompanying drawings, in which:

Fig. 2 is a side view thereof with set of reels removed.

Fig. 3 is a vertical section through the apparatus.

Fig. 4 is a plan view thereof.

Fig. 5 is a transverse horizontal section taken on the line 5—5, Fig. 2 of the drawings, and looking in the direction of the arrows.

Figure 1:
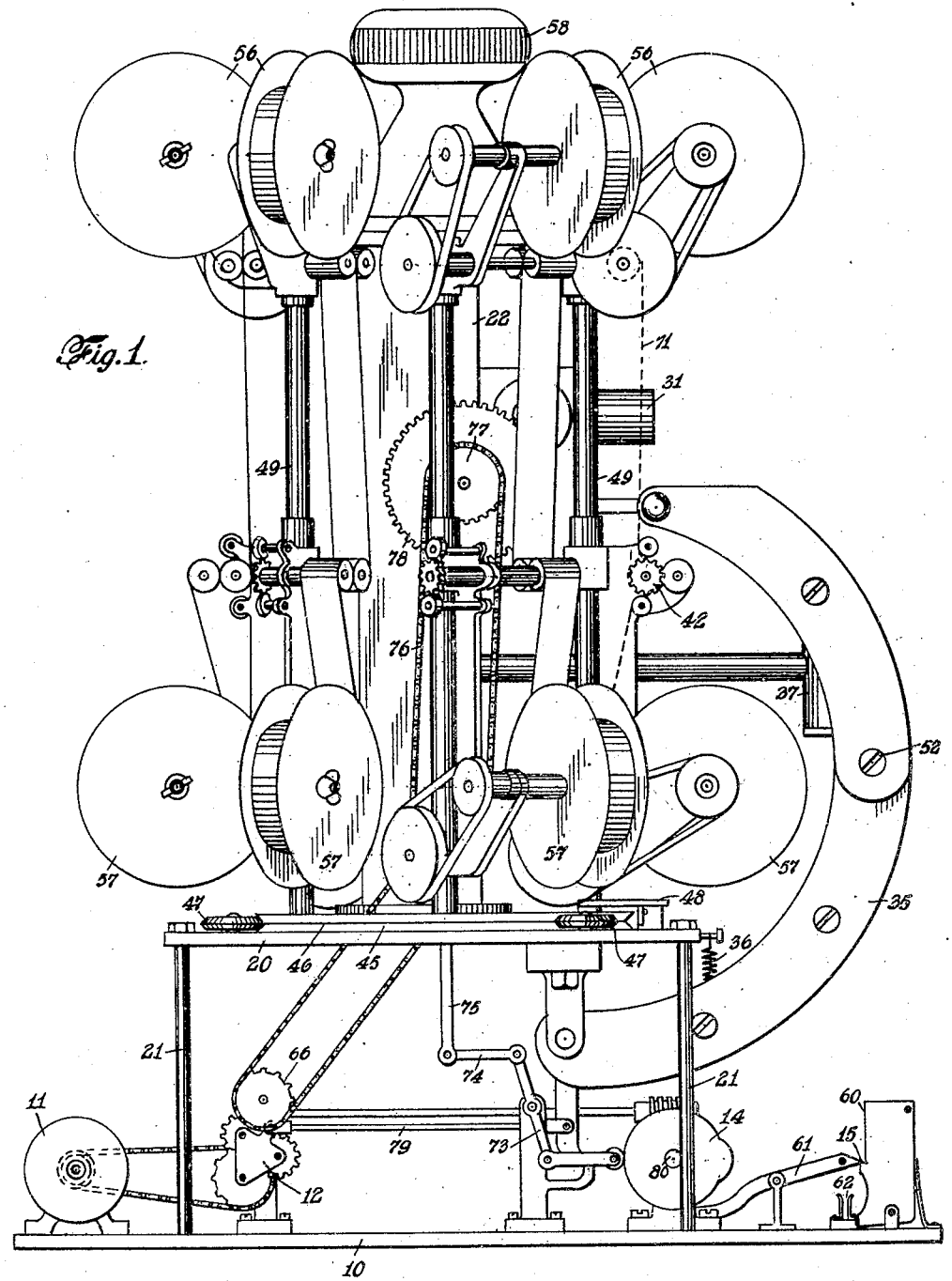
Fig. 1 shows the projector and sound reproducer apparatus in perspective.
Figure 6:
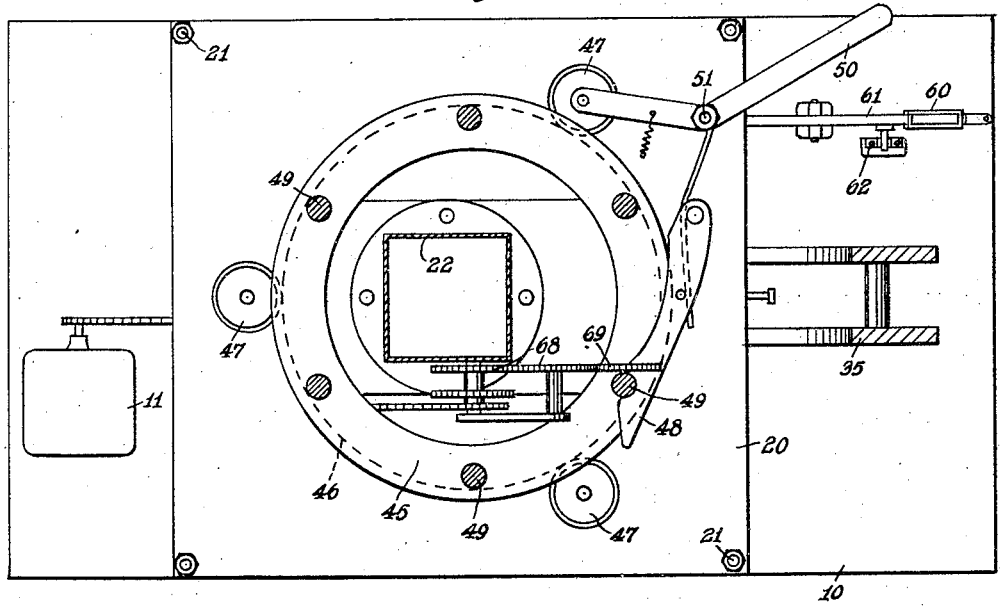
Fig. 6 is a similar view taken on the line 6—6, Fig. 2 of the drawings.
Figure 7:
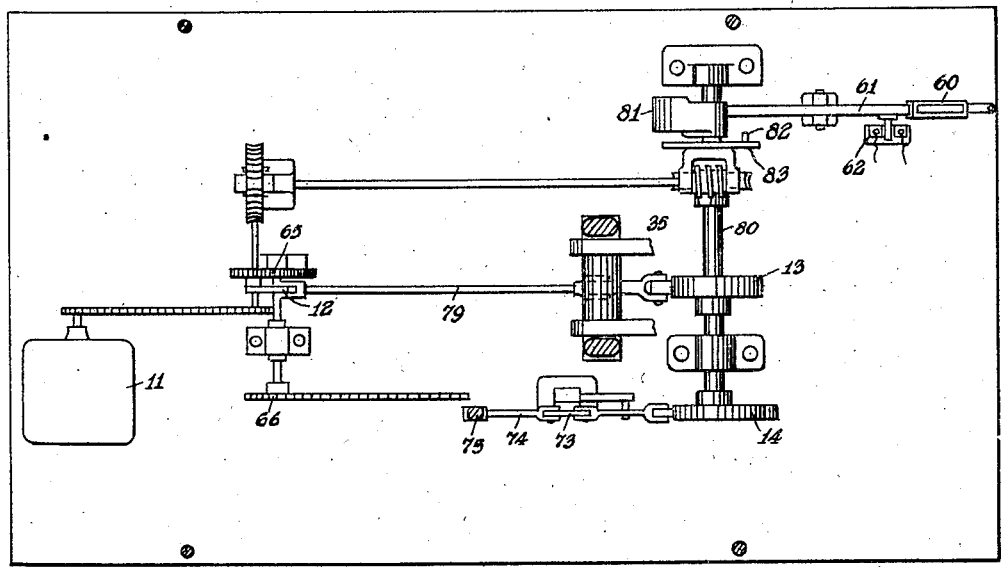
Fig. 7 is a horizontal section taken on the line 7—7, Fig. 2 of the drawings, and looking in the direction of the arrows.

Referring to the drawings, the apparatus is shown as mounted upon a base 10 which may be the bottom of a suitable cabinet (not shown) for housing the mechanism, if desired. This base supports the driving and operating system including, for example, an electric motor 11, reversing mechanism 12 and cams 13 and 14 driven therefrom. In addition, a timing means 15 is mounted on this base for controlling the operation of the motor 11.

Above the base 10 is provided a sub-base 20 supported on posts 21 extending upwardly from base 10, the sub-base in turn supporting the fixed portion of the projection means as well as a rotatable carrier and a movable arm, all associated in the manner hereinafter set forth.

The novel apparatus comprises but a single projection means including a fixed portion, the latter comprising the lamp housing 22 with lamp 23 and reflector 24 for directing rays of light through the condensing lens 25 also carried by the lamp housing. In addition, there is attached to the lamp housing for operation in the optical axis of said lens, shutter mechanism 26 of the well-known rotatable apertured, barrel type, together with means such as the single-toothed sprocket 27 for intermittently advancing a film 28. The latter is designed to pass through an apertured gate whose inner half 29 is similarly carried by the lamp housing and constitutes a member of the fixed portion of the projection means.

The other and outer half 30 of the gate, together with the objective or projector lens 31, is designed for separable relationship with respect to the fixed portion of the projector to be juxtaposed to retain a film between the registering aperture of the separable halves of the gate in the usual manner and the lens 31 in the optical axis of the projector for projection of the film matter upon a suitable screen 32. This screen may be located at a point remote from the apparatus or it may be embodied therewith as when the entire apparatus is to be housed in a suitable cabinet.

The said outer gate half 30 and lens 31 are made thus separable from the fixed portion of the projector for the purpose of permitting films with their respective mountings to be moved past the fixed projector portion and to be located in position before the same for projection of the matter on the film. The separation of the outer gate half 30 with lens 31 is accomplished automatically and in timed relation to the feeding and rewinding of the film, as will herinafter be more fully set forth, through the movement of an arm 35, for example, swingably supported from the underside of the sub-base 20 and biased toward the fixed projector portion as by means of a spring 36.

When the projector apparatus is to be designed to provide also a related audible program, the film of course carries the usual sound track; and the arm 35 supports then one of the elements of the photo-electric system, for example, the exciter lamp 37, the photo-electric cell 38 associated therewith being supported by the lamp housing 22. This housing supports also the lens system 39 and the inner half 40 of an additional gate whose outer half 41 is carried by arm 35. An additional sprocket 42 for equalizing the film advance is carried by the film mounting hereinafter described.

The novel apparatus is arranged for projection of any one of a plurality of films which, to this end, are mounted upon a carrier movably supported on the sub-base 20. Thus, a ring or annulus 45 having a circumferential V-groove 46 is mounted above the sub-base 20 about the lamp housing 22 for rotation about the latter, said annulus being held in position, for example, by a series of three rollers 47 fitting the groove 46 and mounted on the sub-base 20, being equidistantly spaced thereon. One of these rollers is designed to be moved out of contact with the circumference of the annulus so that the carrier may be bodily removed by lifting the same from sub-base 20 over the lamp housing, first moving the same away from the remaining two rollers with release of a spring-urgent detent or pawl 48 which normally engages one of a plurality of posts 49 of the carrier. Detent 48 is designed to hold securely the carrier for positioning a film in the proper location for projection through contact with the post of its associated mounting. The release of the roller is accomplished, for example, by connecting the same with an operating arm 50 pivoted to the sub-base 20 as at 51. To afford adequate clearance, the free end of arm 35 may be jointed to the lower portion as at 52 to enable it to be swung outwardly to a greater extent than is effected automatically by the driving means.

Between the ring 45 and an upper ring or annulus 55 extend the posts 49 in number corresponding to the number of different films which the apparatus is designed to carry, in the present instance six. These films are carried in the usual manner by a set of film reels 56 and 57 supported on the respective posts, the film reel 56 constituting the supply reel and the film reel 57 a take-up reel. Provision is made for feeding film from a reel 56 and winding the same upon the companion reel 57 and, after projection, for rewinding the film from reel 57 to the reel 56, all of which will be hereinafter more fully set forth.

Rotation of the carrier with the plurality of sets of film reels may be effected automatically, if desired, but in the present embodiment a manual means such as the knob 58 attached to the top annulus 55 is indicated. In making a selection, the detent 48 releases at the beginning of rotation and snaps in again to a post 49 when the corresponding desired set of film reels has been located before the projector.

After such film has been selected, the driving mechanism is set in operation, which may be accomplished manually or automatically, provision, however, being made in either case for terminating the operation automatically on the completion of the showing and rewinding of the film. To this end, the means 15 is so designed to initiate operation, the same being in the nature of a coin-controlled circuit-closing member for the motor 11 and embodying a trigger or latch element 60 designed to be tripped by the passage of a coin to release a knife-blade 61 and to return immediately to normal position for subsequently again retaining the knife-blade in the elevated position indicated in Figs. 2 and 3 of the drawings. No claim, however, is made to this feature of the invention, and any well-known and suitable means for closing the motor circuit may be utilized. Knife-blade 61, when released, is designed to close the motor circuit at the contacts 62 which it engages; and the operation of the motor then effects rotation of the reversing mechanism 12 as well as of the cams 13 and 14.

Rotation of the cam 13 swings the arm 35 to the operative position indicated in Figs. 2 and 3 of the drawings to clamp a selected film 28 between the gate halves and to position the lens 31 in the optical axis of the projection system. The transmission system 12 rotates a gear 65 with sprocket 66 in the proper direction for advancing film from a positioned feed reel 56 as through an intermediate sprocket 67, a pair of gears 68 and a gear 69 carried by the corresponding post. The latter gear drives a sprocket 70 and through sprocket chain 71 a sprocket 72, which latter draws film from the feed reel 56, the sprocket 70 winding the same upon the take-up reel 57. However, one of the gears 68 and the gear 69 are normally out of mesh in order to permit of the shifting of the sets of film reels in the selection of a desired film, but are brought into mesh through the action of the cam 14 moving a lever 73, link 74, and bell-crank 75. The gears 68 are mounted on one arm of the bell-crank 75 and are rocked thereby, after arm 35 has been positioned as aforesaid, so as to bring the one gear of the pair into engagement with the coarse teeth of gear 69. This condition will be maintained until substantially all of the film has been drawn from the feed reel 56; and at the same time, through a sprocket chain 76 and a further sprocket 77 and gearing 78, the film-advancing, intermittently operating, toothed sprocket 27 will be rotated to successively present frames of the film for projection; and where sound reproduction is involved, also the sprocket 42.

When a film has been fully run through, cam 13 is in position to retract the arm 35 to free the film, and to shift through a pitman 79 the gear of reversing mechanism 12 such that the sprockets 70 and 72 will rotate in the reverse direction for rewinding of the displayed film on reel 56. This will continue until the film is completely rewound thereon at which time cam 14 will effect the separation of gears 68 and 69, and the power circuit to motor 11 will be interrupted at the contact 62 through the elevation of knife-blade 61. This may be accomplished in any suitable manner, for example as set forth in my U. S. Letters Patent No. 1,759,630. Thus, there is mounted for free rotation on the shaft 80 of cams 13 and 14 a weighted member 81 which is designed to be picked up by a pin 82 extending laterally from an arm 83 rotating with the shaft 80, the timing being such that weight 81 will be elevated to a position of unbalance over the inner end of knife-blade 61 at the particular time the circuit to the motor is to be interrupted. Being mounted for free rotation on the shaft 80, it will descend on the opposite side of the shaft and over the said inner end of the knife-blade to cause its opposite end to be elevated and released from the contacts 62. No claim is made to the specific arrangement for interrupting the motor circuit, as any suitable limit-switch means may be utilized.

The novel arrangement hereinbefore described of a single projection means associated with a plurality of film-reel sets utilizing the ordinary film affords a simple and effective construction, the film being designed to be fed from and then rewound upon the same spool. It is threaded in the usual manner, for example as in the case of projectors for amateurs in home projection. Not making use of an endless type of film, the carrier construction also is greatly simplified, and a particular film or the entire group of films borne by the carrier is readily replaceable. Also, the carrier as a whole may be conveniently removed bodily from the base upon which it is mounted for substitution by a carrier with a new set of films.

I claim:

1. The combination with a single projector means for motion picture film including a base, a lamp-housing with lamp and reflector, condensing lens, shutter mechanism, and a film-advancing means carried by said base: of a separable film gate comprising an inner half fixedly mounted with respect to the base in the optical axis of the lens and the shutter mechanism and an outer half adapted for juxtaposition thereto; a reel carrier frame movably mounted on said base, said frame bearing a plurality of sets of of film reels for juxtaposition to the projector means, each set embodying a feed reel and take-up reel, together with a plurality of means also carried by the frame for feeding a film from one reel to its companion reel; an arm pivoted to the base and biased to swing toward the inner gate half, said arm carrying at its free end the outer gate half for positioning the latter in juxtaposition to the former and adapted for separation therefrom to permit the reel sets to be moved past the inner gate half; a projecting lens carried by said arm adapted to be positioned thereby in the optical axis of the condensing lens and shutter when the gate halves are juxtaposed; means for positioning the carrier frame to locate a selected set of reels with film passing before the inner gate half; driving means fixed with respect to said base; means connecting the same with the shutter mechanism and with the film-advancing means; and intermediate mechanism for moving said pivotally mounted arm into position and for coupling during a predetermined period said driving means with the film-feeding means of a selected set of reels, for restoring the arm to its gate-separating position and for reversing subsequently the feeding movement for the film; and means to interrupt automatically the operation of the driving means at the completion of the cycle of feeding movements.

2. The combination with a single projector means for a plurality of sets of reels of motion picture film including a base, a lamp-housing with lamp and reflector, condensing lens, shutter mechanism, and a film-advancing means carried by said base: of a single film gate common to all of the sets of film reels comprising an inner half fixedly mounted with respect to the base in the optical axis of the lens and the shutter mechanism and an outer half separable therefrom and adapted for juxtaposition thereto; a reel carrier frame movably mounted on said base, said frame bearing a plurality of the sets of film reels for juxtaposition to the projector means, each set embodying a feed reel and a take-up reel, together with a plurality of means also carried by the frame for feeding respective films from one reel to its companion reel and for rewinding the same; an arm movably mounted on the base carrying the outer gate half for positioning the latter during projection in juxtaposition to the inner gate half and for separating thereafter the same therefrom to permit the reel sets to be moved past the inner gate half; a single projecting lens carried by said arm adapted to be positioned simultaneously thereby with the movable gate half in the optical axis of the condensing lens and shutter when the gate halves are juxtaposed; means for positioning the carrier frame when the said gate halves are separated to locate a selected set of reels with film passing before the inner gate half; driving means fixed with respect to said base; means connecting the same with the shutter mechanism and with the film-advancing means; intermediate mechanism for moving said movably mounted arm into position and for coupling during a predetermined period said driving means with the film-feeding and rewinding means of a selected set of reels, for restoring the arm to its gate-separating position and for reversing subsequently the feeding movement for the film; and means to interrupt automatically the operation of the driving means at the completion of the cycle of feeding movements.

3. The combination with a single projector means for a plurality of sets of reels of motion picture film including a base, a lamp-housing with lamp and reflector, condensing lens, shutter mechanism, and a film-advancing means carried by said base: of a single film gate common to all of the sets of film reels comprising an inner half fixedly mounted with respect to the base in the optical axis of the lens and the shutter mechanism and an outer half separable therefrom and adapted for juxtaposition thereto; a reel carrier frame movably mounted on said base, said frame bearing a plurality of the sets of film reels for juxtaposition to the projector means, each set embodying a feed reel and a take-up reel, together with a plurality of means also carried by the frame for feeding respective films from one reel to its companion reel and for rewinding the same; an arm movably mounted on the base carrying the outer gate half for positioning the latter during projection in juxtaposition to the inner gate half and for separating thereafter the same therefrom to permit the reel sets to be moved past the inner gate half; a single projecting lens carried by said arm adapted to be positioned simultaneously thereby with the movable gate half in the optical axis of the condensing lens and shutter when the gate halves are juxtaposed; means for positioning the carrier frame when the said gate halves are separated to locate a selected set of reels with film passing before the inner gate half; an electric motor and motor operating circuit, together with circuit controlling means for closing and interrupting the circuit to said motor, the same being fixed with respect to said base; means connecting the motor with the shutter mechanism and with the film-advancing means; and intermediate mechanism for moving said movably mounted arm into position and for coupling during a predetermined period said motor with the film-feeding and rewinding means of a selected set of reels, for restoring the arm to its gate-separating position and for reversing subsequently the feeding movement for the film; and means automatically effective at the completion of the cycle of feeding movements to actuate the circuit-controlling means to stop operation of the said motor.

4. The combination with a single projector means for a plurality of sets of reels of motion picture film including a base, a lamp-housing with lamp and reflector, condensing lens, shutter mechanism, and a film-advancing means carried by said base: of a single film gate common to all of the sets of film reels comprising an inner half fixedly mounted with respect to the base in the optical axis of the lens and the shutter mechanism and an outer half separable therefrom and adapted for juxtaposition thereto; a reel carrier frame movably mounted on said base, said frame bearing a plurality of the sets of film reels for juxtaposition to the projector means, each set embodying a feed reel and a take-up reel, together with a plurality of means also carried by the frame for feeding respective films from one reel to its companion reel and for rewinding the same; an arm movably mounted on the base carrying the outer gate half for positioning the latter during projection in juxtaposition to the inner gate half and for separating thereafter the same therefrom to permit the reel sets to be moved past the inner gate half; a single projecting lens carried by said arm adapted to be positioned simultaneously thereby with the movable gate half in the optical axis of the condensing lens and shutter when the gate halves are juxtaposed; means for positioning the carrier frame when the said gate halves are separated to locate a selected set of reels with film passing before the inner gate half; driving means fixed with respect to said base; means connecting the same with the shutter mechanism and with the film-advancing means; intermediate mechanism including a cam fixedly mounted on said base driven from said driving means for moving said movably mounted arm into position and for restoring the same to its gate-separating position, and a further cam similarly driven for coupling during a predetermined period said driving means with the film-feeding and rewinding means of a selected set of reels and for reversing subsequently the feeding movement for the film; and means to interrupt automatically the operation of the driving means at the completion of the cycle of feeding movements.

5. The combination with a single projector means for a plurality of sets of reels of motion picture film including a base, a lamp-housing with lamp and reflector, condensing lens, shutter mechanism, and a film-advancing means carried by said base: of a single film gate common to all of the sets of film reels comprising an inner half fixedly mounted with respect to the base in the optical axis of the lens and the shutter mechanism and an outer half separable therefrom and adapted for juxtaposition thereto; a reel carrier frame mounted on said base and rotatable about a vertical axis, said frame comprising a top and bottom annulus and posts circumferentially and equidistantly disposed therebetween and the posts bearing respectively sets of the film reels for juxtaposition to the projector means, each set embodying a feed reel and a take-up reel, together with a plurality of means also carried by the posts for feeding respective films from one reel to its companion reel and for rewinding the same, a selector knob attached to the top annulus for manually rotating the frame to locate a selected set of reels with film passing before the inner gate half; an arm movably mounted on the base carrying the outer gate half for positioning the latter during projection in juxtaposition to the inner gate half and for separating thereafter the same therefrom to permit the reel sets to be moved past the inner gate half; a single projecting lens carried by said arm adapted to be positioned simultaneously thereby with the movable gate half in the optical axis of the condensing lens and shutter when the gate halves are juxtaposed; driving means fixed with respect to said base; means connecting the same with the shutter mechanism and with the film-advancing means; intermediate mechanism for moving said movably mounted arm into position and for coupling during a predetermined period said driving means with the film-feeding and rewinding means of a selected set of reels, for restoring the arm to its gate-separating position and for reversing subsequently the feeding movement for the film; and means to interrupt automatically the operation of the driving means at the completion of the cycle of feeding movements.

6. In a multiple projector, the sub-combination of a movably mounted carrier bearing thereon a plurality of film mounts including a feed reel and a take-up reel, together with means to communicate rotation to the reels of a selected mount alternatively to feed film from the feed feel and to rewind the same thereon, with a single projection means supported independently of the carrier to project a selected film and including separable gate portions, and an element movably mounted with respect to the carrier and projector means bearing the projection lens thereof and one portion of the film gate, together with means for moving said element to juxtapose the film gate portions and to separate the same.

7. In a multiple projector, the sub-combination of a movably mounted carrier bearing thereon a plurality of film mounts including a feed reel and a take-up reel, together with means to communicate rotation to the reels of a selected mount alternatively to feed film from the feed reel and to rewind the same thereon, with a single projection means supported independently of the carrier to project a selected film and including separable gate portions, an element movably mounted with respect to the carrier and projector means bearing the projection lens thereof and one portion of the film gate, and driving means fixed with respect to the carrier adapted for engagement temporarily with the reel rotation means and for moving said movably mounted element to juxtapose the film gate portions and to separate the same.

EDWARD S. RINALDY.